(12) United States Patent
Okada et al.

(10) Patent No.: US 10,325,729 B2
(45) Date of Patent: Jun. 18, 2019

(54) DYE-SENSITIZED SOLAR CELL MODULE

(71) Applicant: Fujikura Ltd., Tokyo (JP)

(72) Inventors: Kenichi Okada, Chiba (JP); Hiroshi Matsui, Tokyo (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 0 days.

(21) Appl. No.: 13/866,491

(22) Filed: Apr. 19, 2013

(65) Prior Publication Data

US 2013/0228208 A1    Sep. 5, 2013

Related U.S. Application Data

(63) Continuation of application No. PCT/JP2011/074229, filed on Oct. 20, 2011.

(30) Foreign Application Priority Data

Oct. 29, 2010 (JP) ................................. 2010-244753

(51) Int. Cl.
*H01G 9/20* (2006.01)

(52) U.S. Cl.
CPC .......... *H01G 9/2068* (2013.01); *Y02E 10/542* (2013.01); *Y02P 70/521* (2015.11)

(58) Field of Classification Search
CPC ...... Y02E 10/542; H01G 9/2068; H01G 9/20; Y02P 70/521
See application file for complete search history.

(56) References Cited

U.S. PATENT DOCUMENTS

| | | | |
|---|---|---|---|
| 2003/0062082 A1* | 4/2003 | Miteva et al. | 136/263 |
| 2003/0140959 A1* | 7/2003 | Gaudiana et al. | 136/244 |
| 2004/0261836 A1* | 12/2004 | Kataoka | H01L 31/0236 136/244 |
| 2006/0070651 A1* | 4/2006 | Kang et al. | 136/256 |
| 2007/0089779 A1* | 4/2007 | Balasubramanian et al. | 136/252 |
| 2007/0240761 A1 | 10/2007 | Miteva et al. | |
| 2010/0071756 A1* | 3/2010 | Krajewski et al. | 136/251 |
| 2010/0116325 A1* | 5/2010 | Nikoonahad | 136/251 |
| 2010/0147364 A1* | 6/2010 | Gonzalez | H01L 31/02021 136/251 |
| 2010/0201493 A1* | 8/2010 | Takano | 340/10.1 |

(Continued)

FOREIGN PATENT DOCUMENTS

| | | |
|---|---|---|
| CN | 101800490 A | 8/2010 |
| EP | 2 085 986 A1 | 8/2009 |

(Continued)

OTHER PUBLICATIONS

International Search Report of PCT/JP2011/074229 dated Nov. 22, 2011.

Office Action, dated Nov. 19, 2013, issued by the Japanese Patent and Trademark Office in counterpart Japanese Patent Application No. 2012-540817.

(Continued)

*Primary Examiner* — Uyen M Tran

(74) *Attorney, Agent, or Firm* — Sughrue Mion, PLLC

(57) ABSTRACT

The present invention provides a dye-sensitized solar cell module having a plurality of dye-sensitized solar cells connected in series, wherein this module has at least one power generation unit in which at least one bypass diode is connected in parallel to n number (where n represents an integer of 1 to 4) of dye-sensitized solar cells among the plurality of dye-sensitized solar cells.

6 Claims, 6 Drawing Sheets

(56) References Cited

U.S. PATENT DOCUMENTS

| | | | |
|---|---|---|---|
| 2010/0206350 A1* | 8/2010 | Montello et al. | 136/244 |
| 2010/0229941 A1* | 9/2010 | Matsui et al. | 136/256 |
| 2010/0229948 A1* | 9/2010 | Chen et al. | 136/259 |
| 2011/0168234 A1* | 7/2011 | Lasich et al. | 136/246 |
| 2012/0062036 A1* | 3/2012 | Rabinovici et al. | 307/77 |

FOREIGN PATENT DOCUMENTS

| | | |
|---|---|---|
| FI | 20041076 A | 9/2004 |
| JP | 2006-278112 A | 10/2006 |
| JP | 2009-507379 A | 2/2009 |
| JP | 2010-186795 A | 8/2010 |
| NO | 20045363 A | 12/2004 |
| SE | 402007 A | 10/2004 |
| WO | 2004/055934 A1 | 7/2004 |
| WO | 2007/028036 A2 | 3/2007 |

OTHER PUBLICATIONS

Chinese Office Action dated Aug. 29, 2014 in Chinese Patent Application No. 201180040550.0.

Sastrawan R. et al., "Interconnecting dye solar cells in modules-I-V characteristics under reverse bias", Journal of Photochemistry and Photobiology A: Chemistry, 2006, vol. 178, pp. 33-40.

Steim R. et al., "Flexible polymer photovoltaic modules with incorporated organic bypass diodes to address module shading effects", Solar Energy Materials & Solar Cells, 2009, vol. 93, pp. 1963-1967.

Communication dated Jul. 10, 2017 from the European Patent Office in counterpart Application No. 11836142.7.

* cited by examiner

DYE-SENSITIZED SOLAR CELL MODULE

CROSS REFERENCE TO RELATED APPLICATIONS

This application is a Continuation of National Stage of International Application No. PCT/JP2011/74229 filed Oct. 20, 2011, claiming priority based on Japanese Patent Application No. 2010-244753 filed Oct. 29, 2010, the contents of all of which are incorporated herein by reference in their entirety.

TECHNICAL FIELD

The present invention relates to a dye-sensitized solar cell module.

BACKGROUND ART

Dye-sensitized solar cells are attracting attention as solar cells that are inexpensive and allow the obtaining of high photoelectric conversion efficiency, and development is proceeding on solar cell modules in which such dye-sensitized solar cells are connected in series (see, for example, Patent Document 1).

PRIOR ART DOCUMENTS

Patent Documents

Patent Document 1: Japanese Patent Application Laid-open No. 2006-278112

SUMMARY OF THE INVENTION

Problems to be Solved by the Invention

However, the dye-sensitized solar cell module described in the above-mentioned Patent Document 1 had the problems indicated below.

Namely, when the above-mentioned dye-sensitized solar cell module was subjected to an outdoor exposure test, there were cases in which power generation efficiency decreased rapidly in a short period of time. Consequently, the above-mentioned dye-sensitized solar cell module has required improvement with respect to durability.

With the foregoing in view, an object of the present invention is to provide a dye-sensitized solar cell module having superior durability.

Means for Solving the Problems

The inventors of the present invention surveyed dye-sensitized solar cell modules in which power generation efficiency had decreased rapidly in a short period of time in order to investigate the cause of the above-mentioned problem. Namely, since white and black spots had formed on a portion of the cells of the dye-sensitized solar cell modules, those cells on which the spots had formed were disassembled and examined. As a result, it was found that air bubbles had formed within the cells on which these spots had formed, and that the cells no longer functioned as cells.

This phenomenon resembles a phenomenon referred to as "hot spot" that occurs in silicon-based solar cell modules. This "hot spot" phenomenon refers to a phenomenon occurring in solar cell modules in which cells become overheated and degrade in the case of having been subjected to extremely large electrical power.

This "hot spot" phenomenon is thought to typically occur in silicon-based solar cell modules. Namely, silicon-based solar cells that compose silicon-based solar cell modules have an I-V characteristic such that, in contrast to current increasing suddenly when a forward bias is applied, current no longer flows when a reverse bias is applied. Due to this I-V characteristic, when reverse bias is applied to a cell, resistance loss increases and the cell overheats and degrades. Therefore, bypass diodes are normally connected in parallel to the cells of silicon-based solar cell modules at the rate of 1 to every 15 to 50 cells in silicon-based solar cell modules in order to avoid the occurrence of this "hot spot" phenomenon.

In contrast, differing from silicon-based solar cells, dye-sensitized solar cell modules are generally thought to not require bypass diodes (see, for example, R. Sastrawan, et al., Journal of Photochemistry and Photobiography A: Chemistry, 178, pp. 33-40, 2006). Namely, in dye-sensitized solar cell modules, since current increases suddenly at even the slightest voltage when reverse bias is applied to the cells that compose the module, resistance loss does not increase and the cells do not overheat. Thus, even if dye-sensitized solar cell modules are operated under conditions at which "hot spot" phenomenon occurs in silicon-based solar cells, the cells do not overheat. Dye-sensitized solar cell modules have been said to ordinarily not require bypass diodes for such reasons.

In actuality, however, a phenomenon resembling "hot spot" phenomenon has been observed even in dye-sensitized solar cell modules as previously described. In addition, dye-sensitized solar cell modules in which power generation efficiency has decreased rapidly in a short period of time have not been provided with bypass diodes. On the basis thereof, the inventors of the present invention thought that the failure to provide bypass diodes in dye-sensitized solar cell modules may be the cause of the above-mentioned phenomenon.

Therefore, bypass diodes were initially connected in parallel at the rate of one every 48 cells, for example, in the same manner as silicon-based solar cell modules.

However, the phenomenon resembling "hot spot" persisted despite having provided these bypass diodes.

On the basis of this result, although it was considered that the above-mentioned phenomenon resembling "hot spot" may not be due to the failure to provide bypass diodes in dye-sensitized solar cell modules, the inventors of the present invention further continued their research. More specifically, various evaluations simulating an outdoor exposed state were carried out using sub-modules similar to those used in dye-sensitized solar cell modules. As a result, it was determined that, although the phenomenon resembling "hot spot" does not occur when only a small reverse voltage is applied to the cells while irradiating with light, the phenomenon resembling "hot spot" occurs in the case of applying an excessive reverse voltage to the cells. Namely, as shown in FIG. 1, although there were no changes observed in the cells in the case of having applied voltage such that the electrical potential of a counter electrode is higher than the electrical potential of a working electrode (forward voltage), gas was generated inside the cells and white spots formed (whitening) starting in the vicinity of −2 V in the case of having applied a voltage such that the electrical potential of the counter electrode is lower than the electrical potential of the working electrode (reverse voltage). Moreover, black spots (blackening) occurred at −6 V or more. This phenomenon was observed even if the type of electrolyte was changed, namely in both different types of electrolytes A and B.

In this manner, the inventors of the present invention found that cells degrade when reverse voltage of about −2.0 V is applied in dye-sensitized solar cell modules. The inventors of the present invention completed the present invention based on this fact and the fact that the power generation voltage of each dye-sensitized solar cell is typically about 0.7 V.

Namely, the present invention is a dye-sensitized solar cell module having a plurality of dye-sensitized solar cells connected in series, wherein this module has at least one power generation unit in which at least one bypass diode is connected in parallel to n number (where n represents an integer of 1 to 4) of dye-sensitized solar cells among the plurality of dye-sensitized solar cells.

According to this dye-sensitized solar cell module, at least one bypass diode is connected in parallel to n number of dye-sensitized solar cells in a power generation unit. Consequently, even if the dye-sensitized solar cell module is placed outdoors, and the amount of generated power decreases due to shadows and the like in one of the dye-sensitized solar cells among the n number of dye-sensitized solar cells in the power generation unit, the maximum voltage applied to the dye-sensitized solar cell in which the amount of generated power has decreased (hereinafter to be referred to as an "abnormal cell") can be limited to the total of the power generation voltage of the abnormal cell and the sum total of each power generation voltage in (n−1) number of dye-sensitized solar cells in which the amount of generated power has not decreased. Here, when the symbol for forward voltage is represented with "+" and the symbol for reverse voltage is represented with "−", since power generation voltage in each of the dye-sensitized solar cells in the power generation unit is typically about +0.7 V, the maximum voltage applied to the abnormal cell is +0.7 [V]−0.7×(n−1) [V]=1.4−0.7×n [V]. Here, since n is an integer of 1 to 4, the maximum voltage applied to the abnormal cell is at +0.7 [V] to −1.4 [V], hence reverse voltage of −2.0 V at which the dye-sensitized solar cells degrade is not applied to the abnormal cell. Thus, according to the dye-sensitized solar cell module of the present invention, abnormal cell degradation can be adequately prevented, enabling the module to have superior durability.

Furthermore, although the power generation voltage of dye-sensitized solar cells is theoretically said to be a maximum of 0.9 [V], according to the present invention, reverse voltage of −2.0 V, at which dye-sensitized solar cells degrade, is not applied to the abnormal cell in this case as well. Namely, when the power generation voltage of each dye-sensitized solar cell is taken to be +0.9 [V], then the maximum voltage applied to the abnormal cell is +0.9 [V]−0.9×(n−1) [V]=1.8−0.9×n [V]. Here, in the case in which n is an integer of 1 to 4, the maximum voltage applied to the abnormal cell becomes +0.9 [V] to −1.8 [V], and reverse voltage of −2.0 V, at which dye-sensitized solar cells degrade, is not applied to the abnormal cell.

In the above-mentioned dye-sensitized solar cell module, n is preferably 1 or 2.

In the case in which n is 1, the maximum voltage applied to the abnormal cell among the n number of dye-sensitized solar cells connected in parallel with bypass diodes in the power generation unit becomes 0.7 [V], while in the case in which n is 2, the maximum voltage applied to the abnormal cell becomes 0 [V]. Thus, there is no longer concern over cell degradation by reverse voltage in the abnormal cell.

In the above-mentioned dye-sensitized solar cell, when the total number of the above-mentioned plurality of dye-sensitized solar cells connected in series is represented by m (where m represents an integer of 2 or more), the number of power generation units in which n is 1 is represented by p1 (where p1 represents an integer of 0 or more), the number of power generation units in which n is 2 is represented by p2 (where p2 represents an integer of 0 or more), the number of power generation units in which n is 3 is represented by p3 (where p3 represents an integer of 0 or more), the number of power generation units in which n is 4 is represented by p4 (where p4 represents an integer of 0 or more), and when the number of the above-mentioned dye-sensitized solar cells to which the aforementioned bypass diodes are not connected in parallel is represented by k, then k, as represented by the following formula, is preferably 0:

$$k = m - (1 \times p1 + 2 \times p2 + 3 \times p3 + 4 \times p4)$$

(where, the total of p1 to p4 is 1 or more).

In this case, in dye-sensitized solar cell modules, there are no longer any dye-sensitized solar cells to which bypass diodes are not connected in parallel. Thus, in a dye-sensitized solar cell module in which k is 0, no matter which dye-sensitized solar cell becomes an abnormal cell, current is bypassed to a bypass diode. Consequently, dye-sensitized solar cell modules in which k is 0 are able to function better in terms of the overall dye-sensitized solar cell module in comparison with the case in which dye-sensitized solar cells to which bypass diodes are not connected in parallel are present.

In the above-mentioned dye-sensitized solar cell module, the above-mentioned dye-sensitized solar cells have a working electrode and a counter electrode opposite the above-mentioned working electrode, and one of the above-mentioned working electrode and the above-mentioned counter electrode in at least one of the dye-sensitized solar cells among the above-mentioned n number of dye-sensitized solar cells contained in the above-mentioned power generation unit preferably has a flexible substrate.

If one of the working electrode and the counter electrode has a flexible substrate, the working electrode or counter electrode having the flexible substrate is able to bend towards the side of the electrode opposite thereto. In this case, since the distance between electrodes can be shortened, the photoelectric conversion efficiency of each dye-sensitized solar cell can be improved. However, if negative voltage is applied between the working electrode and the counter electrode, air bubbles form between the working electrode and the counter electrode and expand. At this time, if either the working electrode or counter electrode has a flexible substrate, the distance between electrodes at the location where air bubbles have formed ends up increasing, and a larger negative voltage is applied to that portion. With respect to this point, the use of bypass diodes makes it possible to prevent the occurrence of malfunctions caused by application of negative voltage even if such a negative voltage is applied.

In the above-mentioned dye-sensitized solar cell module, the above-mentioned dye-sensitized solar cells have a working electrode and a counter electrode opposite the above-mentioned working electrode, the above-mentioned working electrode has an electrically conductive substrate, an oxide semiconductor layer provided on the surface of the above-mentioned electrically conductive substrate, and a photosensitizing dye deposited onto the above-mentioned oxide semiconductor layer, and a connection region for the above-mentioned bypass diodes for connection to the above-mentioned working electrode or the above-mentioned counter electrode is preferably provided at a location where the region does not overlap with the above-mentioned oxide semiconductor layer in cases where the above-mentioned connection region and the above-mentioned oxide semiconductor layer are viewed from a direction perpendicular to the surface of the above-mentioned electrically conductive substrate.

In this case, the connection region for the bypass diodes for connection to the working electrode or the counter electrode is provided at a location where the region does not overlap with the oxide semiconductor layer in cases where the connection region and the oxide semiconductor layer are viewed from a direction perpendicular to the surface of the electrically conductive substrate. Consequently, in the case in which current is transferred from a certain dye-sensitized solar cell to another dye-sensitized solar cell through a bypass diode, heat is generated in the connection region due to resistance. In this case as well, since the connection region and the oxide semiconductor layer do not mutually overlap in the case of viewing the connection region and the oxide semiconductor layer from a direction perpendicular to the surface of the electrically conductive substrate, transfer of heat to the heat-susceptible photosensitizing dye deposited on the oxide semiconductor layer can be adequately inhibited. In addition, in the case in which the connection region is provided on the counter electrode, for example, there is the possibility of the portion of the counter electrode provided with the connection region (to be referred to as the "connection region installed portion") approaching the oxide semiconductor layer as a result being pushed towards the side of the oxide semiconductor layer of the working electrode when connecting a bypass diode, as well as the possibility of approaching the oxide semiconductor layer or moving away from the oxide semiconductor layer due to the weight of the bypass diode itself. Consequently, there is the possibility of the distance between the counter electrode and the oxide semiconductor layer (inter-electrode distance) in the connection region installed portion varying from portions other than the connection region installed portion. As a result, since voltage between the counter electrode and the oxide semiconductor layer of the working electrode increases or decreases only in the connection region installed portion, voltage concentrates between the connection region installed portion and the oxide semiconductor layer of the working electrode, resulting in increased susceptibility to the application of negative voltage. With respect to this point, in the present invention, a connection region of a bypass diode is provided at a location that does not overlap with the oxide semiconductor layer in the case of viewing the connection region and the oxide semiconductor layer from a direction perpendicular to the surface of the electrically conductive substrate. Consequently, it becomes increasingly difficult to form a portion where inter-electrode distance between the counter electrode and oxide semiconductor layer of the working electrode differs, and it becomes increasingly difficult for voltage to concentrate between the counter electrode and the oxide semiconductor layer of the working electrode, thereby resulting in less susceptibility to the application of negative voltage. Consequently, the occurrence of a malfunction in the dye-sensitized solar cells can be adequately prevented, and the durability of the dye-sensitized solar cell module can be further improved.

In the above-mentioned dye-sensitized solar cell module, the above-mentioned dye-sensitized solar cells contain a working electrode and a counter electrode, which has a metal substrate, opposite the above-mentioned working electrode, and the above-mentioned bypass diodes preferably connect the back sides on the opposite side of the above-mentioned metal substrates, contained in the above-mentioned counter electrodes of two of the above-mentioned dye-sensitized solar cells, to the above-mentioned working electrode.

In this case, bypass diodes connect the back sides of metal substrates contained in the counter electrodes of two dye-sensitized solar cells. Consequently, differing from the case of transparent electrically conductive films of working electrodes being connected by bypass diodes, it is not necessary to create spaces where bypass diodes are arranged between two dye-sensitized solar cells. Consequently, in comparison with case of bypass diodes connecting the transparent electrically conductive films of working electrodes, power generation surface area in the dye-sensitized solar cells can be further increased.

In the above-mentioned dye-sensitized solar cell module, the dye-sensitized solar cell module further has a back sheet that covers the above-mentioned dye-sensitized solar cells, and at least one of the above-mentioned bypass diodes is preferably provided between the above-mentioned back sheet and the above-mentioned dye-sensitized solar cells.

In this case, the entry of foreign matter such as water into the bypass diodes can be prevented by this back sheet. In addition, since at least one bypass diode is provided between the back sheet and the dye-sensitized solar cells, power generation surface area can be further increased in comparison with the case of bypass diodes being provided between corresponding dye-sensitized solar cells.

Effect of the Invention

According to the present invention, a dye-sensitized solar cell module is provided that has superior durability.

MODES FOR CARRYING OUT THE INVENTION

The following provides a detailed explanation of embodiments of the present invention with reference to the drawings.

First Embodiment

First, an explanation is provided of a first embodiment of a dye-sensitized solar cell module according to the present invention using FIGS. 2 to 5.

Figure 1:
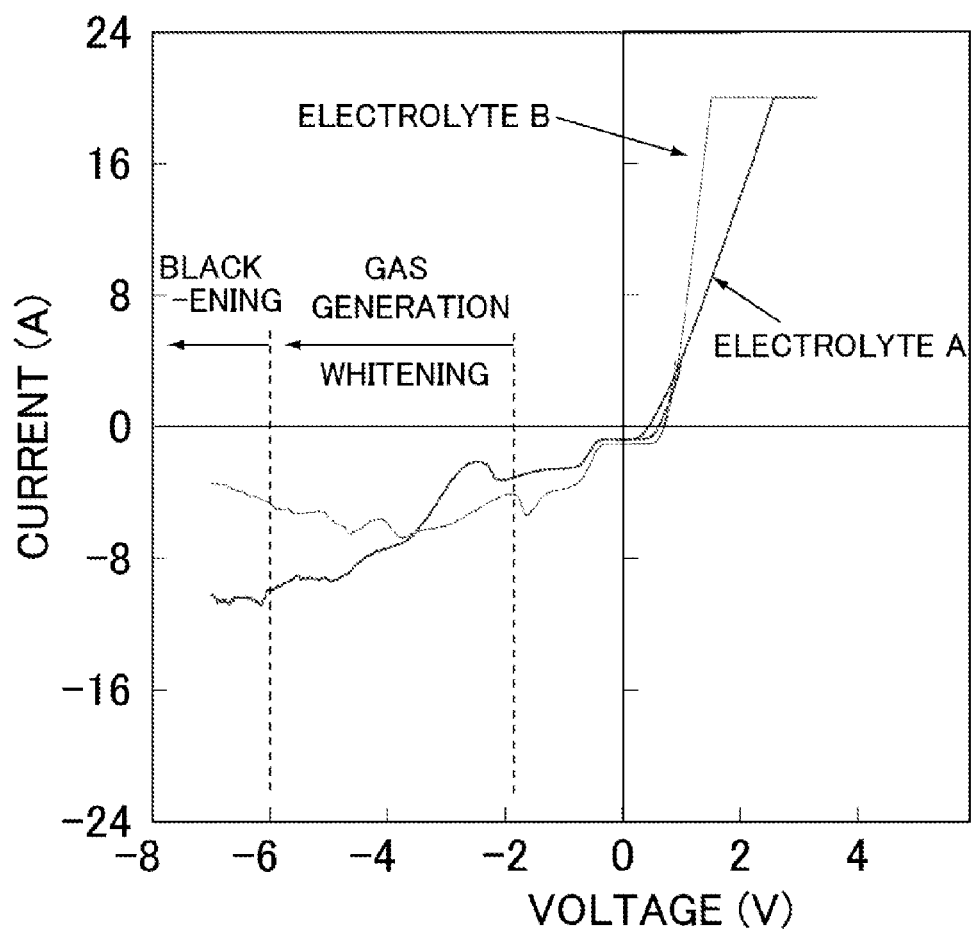
FIG. 1 is a graph showing I-V characteristics in a sub-module similar to that used in a dye-sensitized solar cell module.
Figure 2:
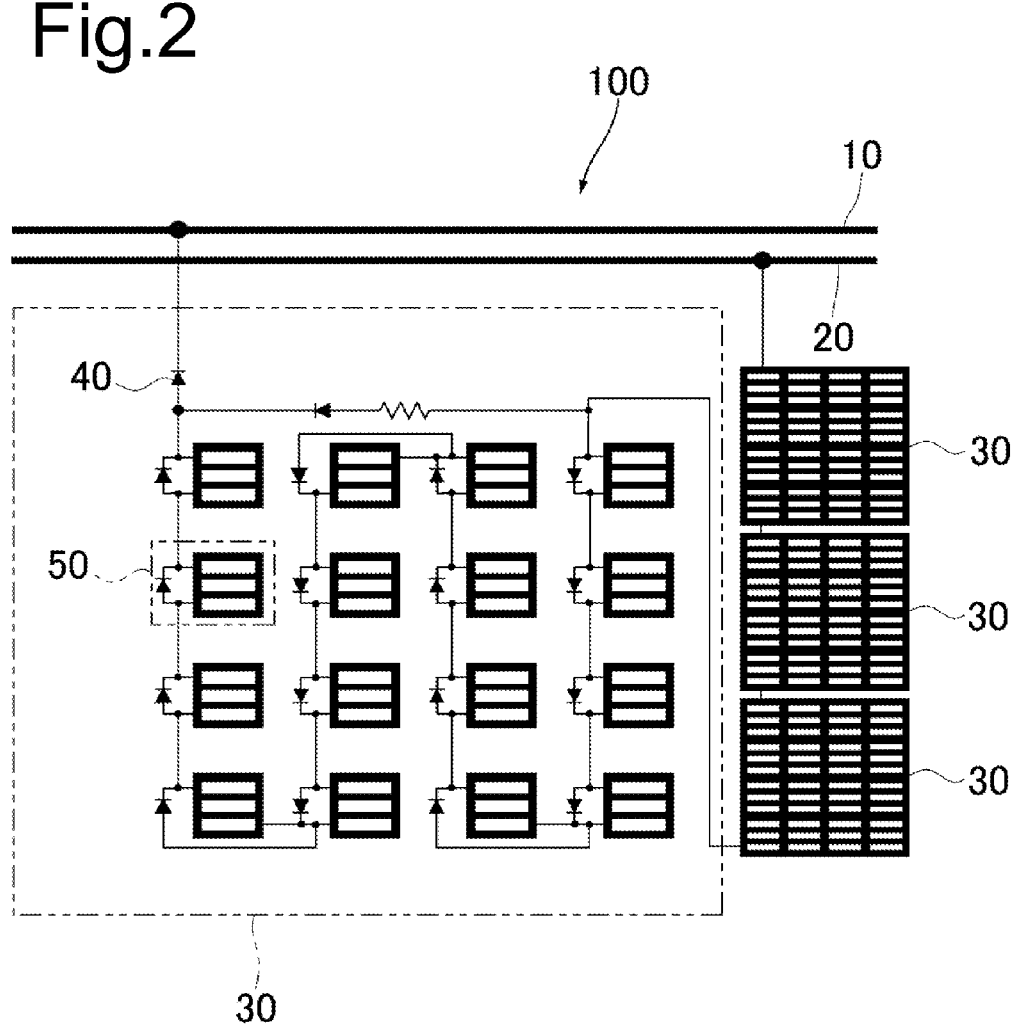
FIG. 2 is a circuit diagram showing one embodiment of a dye-sensitized solar cell module according to the present invention.
Figure 3:
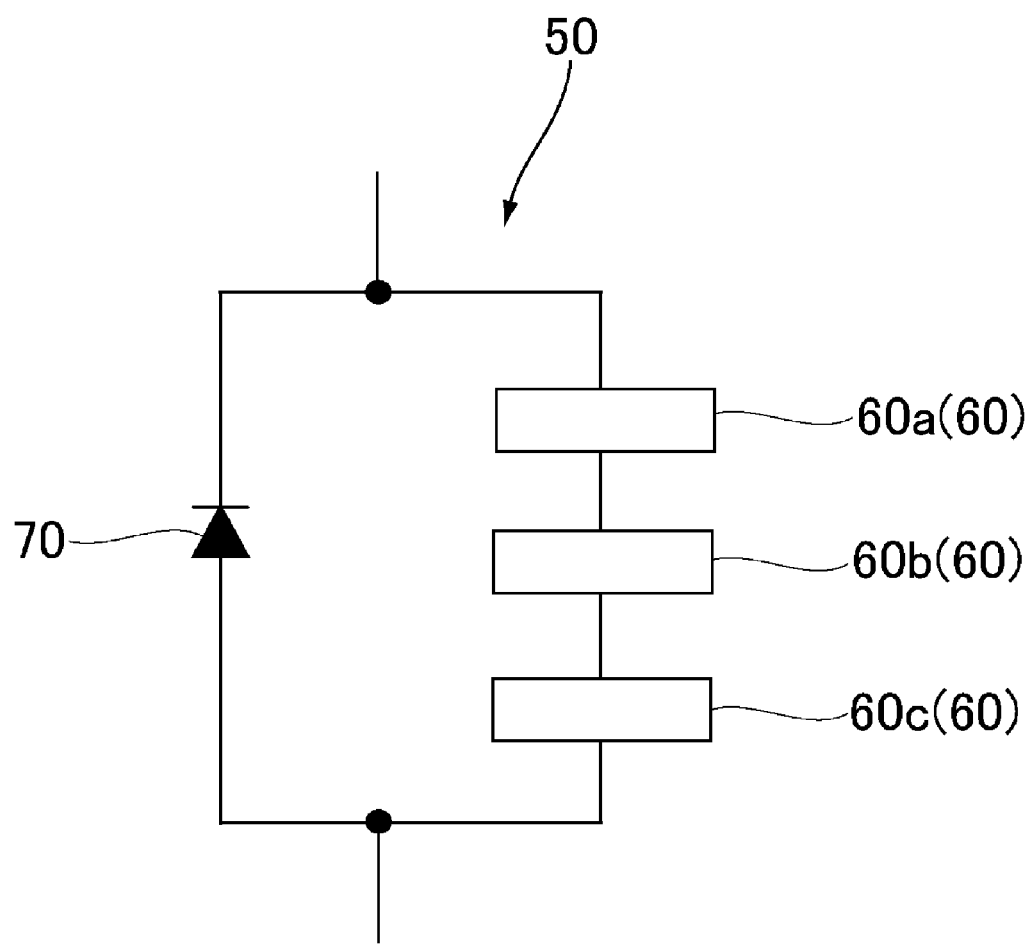
FIG. 3 is a drawing showing the configuration of a power generation unit in FIG. 2.
Figure 4:
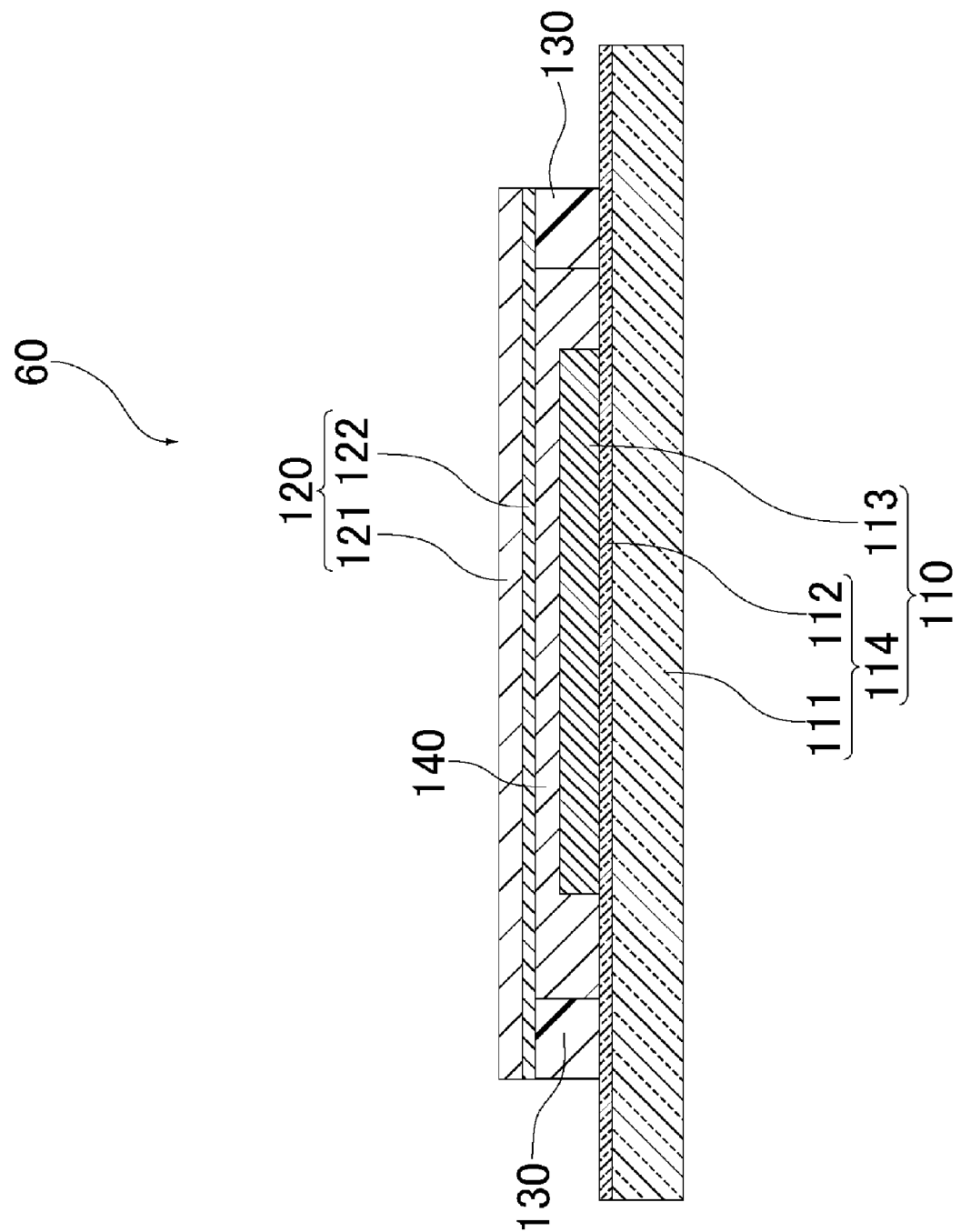
FIG. 4 is a cross-sectional view showing an example of the configuration of a dye-sensitized solar cell.
Figure 5:
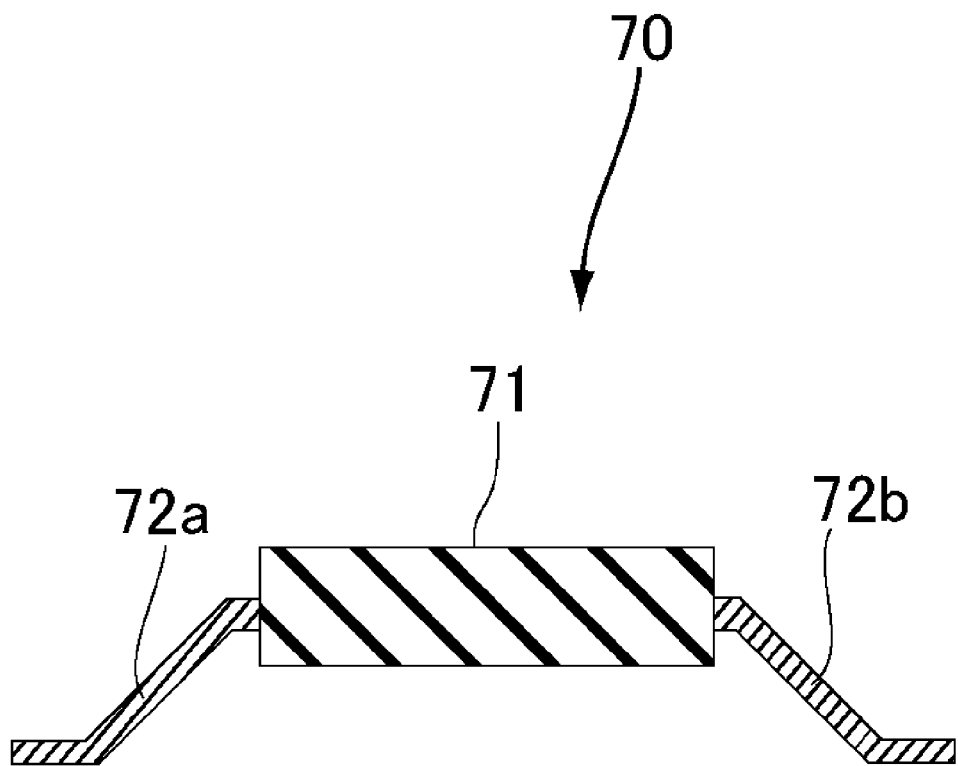
FIG. 5 is a cross-sectional view showing an example of a bypass diode in FIG. 3.

FIG. 2 is a circuit diagram showing a first embodiment of a dye-sensitized solar cell module according to the present invention, FIG. 3 is a drawing showing the configuration of a power generation unit in FIG. 2, FIG. 4 is a cross-sectional view showing an example of the configuration of a dye-sensitized solar cell, and FIG. 5 is a cross-sectional view showing an example of a bypass diode in FIG. 3.

As shown in FIG. 2, a dye-sensitized solar cell module 100 is provided with a power generation system power collection line 10, a ground line 20, a plurality (four in the present embodiment) of dye-sensitized solar panels 30 arranged between the power generation system power collection line 10 and the ground line 20, and a blocking diode 40 that blocks reverse current from the power generation system power collection line 10 to the dye-sensitized solar cell panels 30.

The plurality of dye-sensitized solar panels 30 and the blocking diode 40 are connected in series between the power generation system power collection line 10 and the ground line 20.

As shown in FIG. 2, the dye-sensitized solar panel 30 has 16 power generation units 50, and 16 power generation units 50 are connected in series in the dye-sensitized solar panel 30. Here, as shown in FIG. 3, one bypass diode 70 is connected in parallel to three dye-sensitized solar cells 60 connected in series in the power generation unit 50. Thus, 48 dye-sensitized solar cells 60 are connected in series in a single dye-sensitized solar panel 30, and 48×4=192 dye-sensitized solar cells 60 are connected in series in the entire dye-sensitized solar cell module 100. Furthermore, two or more bypass diodes 70 may be provided in the power generation unit 50.

According to the dye-sensitized solar cell module 100, a single bypass diode 70 is connected in parallel to three dye-sensitized solar cells 60 in the power generation unit 50. Consequently, even if the dye-sensitized solar cell module 100 is placed outside and the amount of generated power decreases due to shadows and the like in any one of the dye-sensitized solar cells 60 among the three dye-sensitized solar cells 60 in the power generation unit 50, the maximum voltage applied to the abnormal cell in which the amount of generated power has decreased can be limited to the total of the power generation voltage of the abnormal cell and the sum total of each power generation voltage of the two dye-sensitized solar cells in which the amount of generated power has not decreased. Here, when the symbol for forward voltage is represented with "+" and the symbol for reverse voltage is represented with "−", since power generation voltage in each of the dye-sensitized solar cells 60 in the power generation unit 50 is normally about 0.7 V, the maximum voltage applied to the abnormal cell is +0.7 [V]−0.7×(n−1) [V]=1.4−0.7×n [V]. Since n is 3 in the present embodiment, the maximum voltage applied to the abnormal cell becomes −0.7 [V], and reverse voltage of −2.0 V, at which the dye-sensitized solar cells 60 degrade, is not applied to the abnormal cell. Thus, according to the dye-sensitized solar cell module 100 of the present embodiment, degradation of the abnormal cell can be adequately prevented and the dye-sensitized solar cell module can have superior durability.

Here, as shown in FIG. 4, the dye-sensitized solar cell 60 is provided with a working electrode 110, a counter electrode 120, a seal portion 130 that connects the working electrode 110 and the counter electrode 120, and an electrolyte 140 surrounded by the working electrode 110, the counter electrode 120 and the seal portion 130. In the dye-sensitized solar cell module 100, adjacent dye-sensitized solar cells 60 are connected in series by electrically connecting the working electrode 110 of one of these cells and the counter electrode 120 of the other one of these cells.

On the other hand, as shown in FIG. 5, the bypass diode 70 has a body portion 71, a first connection terminal 72a connected to the body portion 71, and a second connection terminal 72b connected to the body portion 71. The first connection terminal 72a is electrically connected to the counter electrode 120 of a dye-sensitized solar cell 60c shown in FIG. 3, and the second connection terminal 72b is electrically connected to the working electrode 110 of a dye-sensitized solar cell 60a shown in FIG. 3.

The working electrode 110 is provided with a transparent substrate 111, a transparent electrically conductive film 112 provided on the transparent substrate 111, and a porous oxide semiconductor layer 113 provided on the transparent electrically conductive film 112. Here, an electrically conductive substrate 114 is composed by the transparent substrate 111 and the transparent electrically conductive film 112. In addition, a photosensitizing dye is deposited on the porous oxide semiconductor layer 13.

The material that composes the transparent substrate 111 may be, for example, a transparent material, and examples of such transparent materials include glass such as borosilicate glass, soda lime glass, glass which is made of soda lime and whose iron component is less than that of ordinary soda lime glass, or quartz glass, polyethylene terephthalate (PET), polyethylene naphthalate (PEN), polycarbonate (PC) and polyether sulfone (PES). The thickness of the transparent substrate 111 is suitably determined corresponding to the size of the dye-sensitized solar cells 60, and although there are no particular limitations thereon, it may be within the range of, for example, 50 μm to 10000 μm.

Examples of materials that compose the transparent electrically conductive film 112 include electrically conductive metal oxides such as tin-doped indium oxide (indium tin oxide, ITO), tin oxide ($SnO_2$) or fluorine-doped tin oxide (FTO). The transparent electrically conductive film 112 may be composed of a single layer or a laminate of multiple layers composed of different electrically conductive metal oxides. In the case in which the electrically conductive metal film 112 is composed of a single layer, the transparent electrically conductive film 112 is preferably composed of FTO since it has high heat resistance and chemical resistance. In addition, the use of a laminate composed of multiple layers for the transparent electrically conducive film 112 is preferable since this makes it possible to reflect the properties of each layer therein. In particular, a laminate of a layer composed of ITO and a layer composed of FTO is used preferably. In this case, a transparent electrically conductive film can be realized that has high electrical conductivity, heat resistance and chemical resistance. The thickness of the transparent electrically conductive film 112 may be within the range of, for example, 0.01 μm to 2 μm.

The porous oxide semiconductor layer 113 is formed from oxide semiconductor particles. Examples of the above-mentioned oxide semiconductor particles include oxide semiconductor particles composed of titanium oxide ($TiO_2$), zinc oxide (ZnO), tungsten oxide ($WO_5$), niobium oxide ($Nb_2O_5$), strontium titanate ($SrTiO_3$), tin oxide ($SnO_2$), indium oxide ($In_2O_3$), zirconium oxide ($ZrO_2$), thallium oxide ($Ta_2O_5$), lanthanum oxide ($La_2O_3$), yttrium oxide ($Y_2O_2$), holmium oxide ($Ho_2O_2$), bismuth oxide ($Bi_2O_3$), cerium oxide ($CeO_2$), aluminum oxide ($Al_2O_2$) and mixtures of two or more types thereof. The mean particle diameter of these oxide semiconductor particles is preferably 1 nm to 1000 nm since the surface area of the oxide semiconductor coated with dye increases, namely those sites where photoelectric conversion takes place become larger, thereby enabling the generation of a larger number of electrons. Here, the porous oxide semiconductor layer 113 is preferably composed of a laminate obtained by laminating oxide semiconductor particles having different particle size distributions. In this case, this allows light to be repeatedly reflected within the laminate, and enables incident light to be efficiently converted to electrons without escaping outside the laminate. The thickness of the porous oxide semiconductor layer 113 may be, for example, 0.5 μm to 50 μm. Furthermore, the porous oxide semiconductor layer 113 can also be composed of a laminate of multiple semiconductor layers composed of different materials.

Examples of photosensitizing dyes include ruthenium complexes having ligands containing a bipyridine structure, terpyridine structure and the like, and organic dyes such as porphyrin, eosin, rhodamine or merocyanine.

The counter electrode 120 is provided with a counter electrode substrate 121 and a catalyst film 122 provided on the counter electrode substrate 121.

The counter electrode substrate 121 is composed of a corrosion-resistant metal material such as titanium, nickel, platinum, molybdenum or tungsten, or a material obtained by forming an electrically conductive oxide such as ITO or FTO on the same material as that of the transparent substrate 111. The thickness of the counter electrode substrate 121 is suitably determined corresponding to the size of the dye-sensitized solar cells 60, and although there are no particular limitations thereon, it may be, for example, 0.005 mm to 0.1 mm.

The catalyst film 122 is composed of platinum, a carbon-based material or an electrically conductive polymer and the like.

The counter electrode substrate 121 is preferably a flexible substrate.

In this case, since the counter electrode 120 has a flexible substrate, the counter electrode 120 having this flexible substrate is able to bend towards the side of the working electrode 110 located in opposition thereto. In this case, since the inter-electrode distance can be shortened, the photoelectric conversion efficiency of each dye-sensitized solar cell 60 can be improved. However, if a negative voltage is applied between the working electrode 110 and the counter electrode 120, air bubbles form between the working electrode 110 and the counter electrode 120 and expand. At this time, if the counter electrode 120 has the counter electrode substrate 121 which is a flexible substrate, the inter-electrode distance at locations where air bubbles have formed ends up increasing. In this case, a larger negative voltage is applied to those portions. With respect to this point, use of the bypass diodes 70 makes it possible to prevent the occurrence of malfunctions caused by application of negative voltage even if such a negative voltage is applied.

The seal portion 130 is composed of, for example, an ionomer, ethylene-vinyl acetic anhydride copolymer, ethylene-methacrylic acid copolymer, ethylene-vinyl alcohol copolymer, ultraviolet-curable resin or vinyl alcohol copolymer.

The electrolyte 140 is normally composed of an electrolytic solution, and this electrolytic solution contains, for example, a redox couple such as $I^-/I_3^-$ and an organic solvent. Examples of organic solvents that can be used include acetonitrile, methoxyacetonitrile, methoxypropionitrile, propionitrile, ethylene carbonate, propylene carbonate, diethyl carbonate and γ-butyrolactone. Examples of redox couples include bromine/bromide ion in addition to $I^-/I_3^-$. The dye-sensitized solar cells 60 are particularly effective in the case of using for the electrolyte an electrolytic solution containing a volatile solute in the manner of $I^-/I_3^-$ for the redox couple and an organic solvent that easily volatilizes at high temperatures in the manner of acetonitrile, methoxyacetonitrile or methoxypropionitrile. This is because, in this case, changes in internal voltage of the cell space caused by changes in the environmental temperature surrounding the dye-sensitized solar cells 60 are particularly large, thereby facilitating escape of the electrolyte 140 from the interface between the seal portion 130 and the counter electrode 120 and from the interface between the seal portion 130 and the working electrode 110. Furthermore, a gelling agent may also be added to the above-mentioned volatile solvent. In addition, the electrolyte 140 may also be composed of an ionic liquid electrolyte composed of a mixture of an ionic liquid and a volatile component. This is because, in this case as well, changes in internal voltage of the cell spaces caused by changes in the environmental temperature surrounding the dye-sensitized solar cells 60 are large. Known iodine salts such as pyridinium salts, imidazolium salts or triazolium salts, which are normal temperature molten salts in a molten state in the vicinity of room temperature, are used as ionic liquids. 1-ethyl-3-methylimidazolium bis(trifluoromethylsulfonyl)imide, for example, is used preferably as such a normal temperature molten salt. In addition, examples of volatile components include the above-mentioned organic solvents as well as 1-methyl-3-methylimidazolium iodide, LiI, $I_2$ and 4-t-butylpyridine. Moreover, a quasi-solid electrolyte in the form of a nanocomposite ion-gel electrolyte, obtained by mixing nanoparticles of $SiO_2$, $TiO_2$ or carbon nanotubes and the like into the above-mentioned ionic liquid electrolyte to form a gel-like state, or an ionic liquid electrolyte, which has been gelled by using an organic gelling agent such as polyvinylidene fluoride, polyethylene oxide derivatives or amino acid derivatives, may also be used for the electrolyte 140.

Second Embodiment

Figure 6:
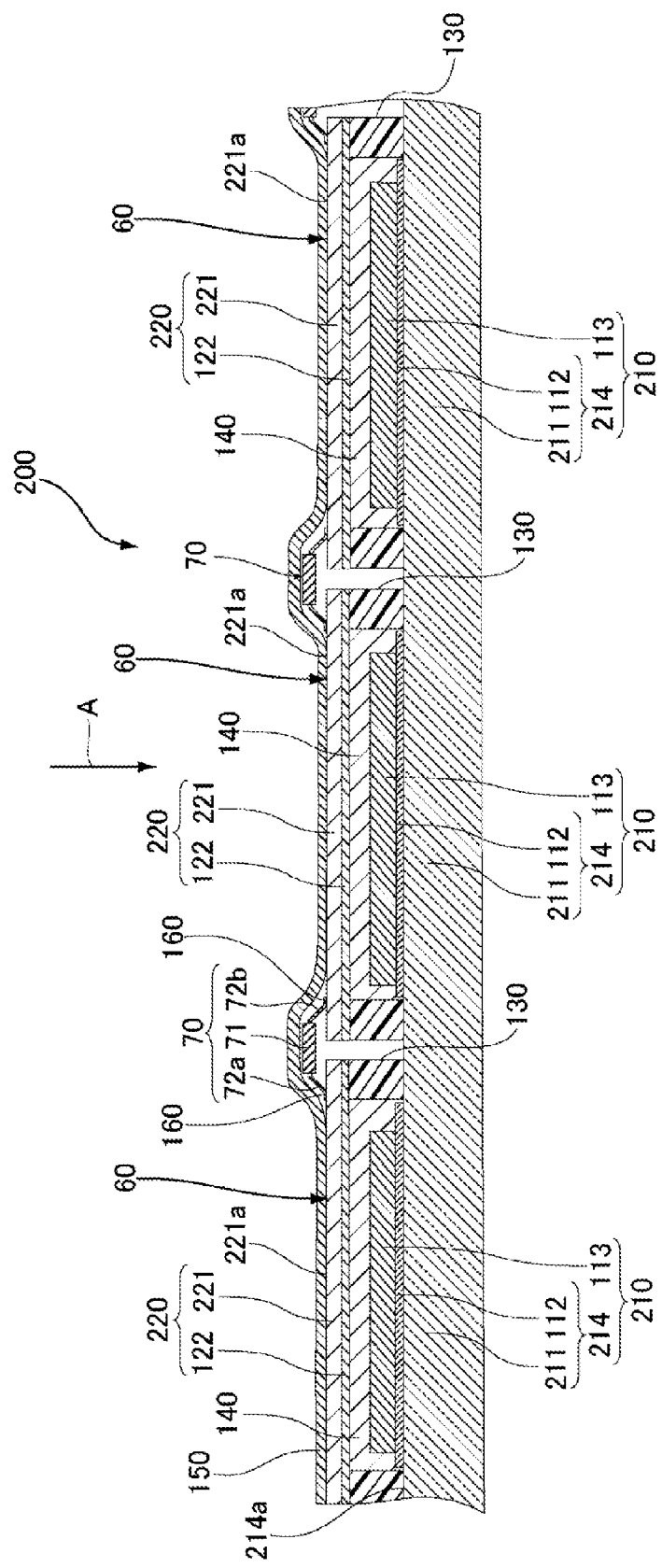
FIG. 6 is a partial cross-sectional view showing another embodiment of a dye-sensitized solar cell module according to the present invention.

The following provides an explanation of a second embodiment of a dye-sensitized solar cell module of the present invention with reference to FIG. 6. FIG. 6 is a partial cross-sectional view showing a second embodiment of a dye-sensitized solar cell module of the present invention. Furthermore, the same reference symbols are used in FIG. 6 to indicate those constituent elements that are the same as or similar to those of the first embodiment, and duplicate explanations thereof are omitted.

As shown in FIG. 6, a dye-sensitized solar cell module 200 of the present embodiment first differs in that a counter electrode substrate 221 of each dye-sensitized solar cell 60 is composed of a metal substrate, and back sides 221a on the opposite side from a working electrode 210 of the counter electrode substrates 221 contained in counter electrodes 220 of two adjacent dye-sensitized solar cells 60 are connected by a single bypass diode 70. Here, since the back sides 221a of the counter electrode substrates 221 of two adjacent dye-sensitized solar cells 60 are connected by a single bypass diode 70, a single bypass diode 70 is connected in parallel to a single dye-sensitized solar cell 60 in the power generation unit 50.

In this case, each bypass diode 70 connects the back sides 221a of the counter electrode substrates 221 contained in the counter electrodes 220 of two dye-sensitized solar cells 60. Consequently, differing from the case in which each bypass diode 70 connects the transparent electrically conductive films 112 of the working electrodes 210 of two dye-sensitized solar cells 60, it is not necessary to create space for arranging the bypass diode 70 between two dye-sensitized solar cells 60. Consequently, in comparison with the case of the bypass diode 70 connecting the transparent electrically conductive films 112 of the working electrodes 210 of two dye-sensitized solar cells 60, power generation surface area in the dye-sensitized solar cell module 200 can be further increased.

Secondly, the dye-sensitized solar cell module 200 of the present embodiment also differs from the dye-sensitized solar cell module 100 of the first embodiment in that it further has a back sheet 150 that covers the dye-sensitized solar cells 60, and has the bypass diodes 70 between the back sheet 150 and the dye-sensitized solar cells 60.

In this case, foreign matter such as water can be prevented from entering the bypass diodes 70 by the back sheet 150. In addition, since the bypass diodes 70 are provided between the back sheet 150 and the dye-sensitized solar cells 60, power generation surface area can be further increased in comparison with the case in which the bypass diodes 70 are provided between the dye-sensitized solar cells 60.

Thirdly, the dye-sensitized solar cell module 200 of the present embodiment also differs from the dye-sensitized solar cell module 100 of the first embodiment in that a connection region 160 for the bypass diode 70 for connection to the counter electrode 220 is provided at a location that does not overlap with the porous oxide semiconductor layer 113 in the case of viewing the connection region 160 and the porous oxide semiconductor layer 113 from a direction A perpendicular to a surface 219a of an electrically conductive substrate 214.

In this case, the connection region 160 for the bypass diode 70 for connection to the counter electrode 220 is provided at a location that does not overlap with the porous oxide semiconductor layer 113 in the case of viewing the connection region 160 and the porous oxide semiconductor layer 113 from the direction A perpendicular to the surface 214a of the electrically conductive substrate 214. Consequently, in the case in which current is transferred from a certain dye-sensitized solar cell 60 to another dye-sensitized solar cell 60 through the bypass diode 70, heat is generated in the connection region 160 due to resistance. In this case as well, since the connection region 160 and the porous oxide semiconductor layer 113 do not mutually overlap in the case of viewing the connection region 160 and the porous oxide semiconductor layer 113 from the direction A perpendicular to the surface 214a of the electrically conductive substrate 214, transfer of heat to heat-susceptible photosensitizing dye deposited on the porous oxide semiconductor layer 113 can be adequately inhibited. In addition, since the connection region 160 is provided on the back side 221a of the counter electrode substrate 221 of the counter electrode 220 in the dye-sensitized solar cells 60, there is the possibility of the portion of the counter electrode 220 provided with the connection region 160 (connection region installed portion) approaching the porous oxide semiconductor layer 113 as a result being pushed towards the side of the porous oxide semiconductor layer 113 of the working electrode 210 when connecting the bypass diode 70, as well as the possibility of approaching the porous oxide semiconductor layer 113 or moving away from the porous oxide semiconductor layer 113 due to the weight of the bypass diode 70 itself. Consequently, there is the possibility of the distance between the counter electrode 220 and the porous oxide semiconductor layer 113 (inter-electrode distance) in the connection region installed portion varying from portions other than the connection region installed portion. In this case, since voltage between the counter electrode 220 and the porous oxide semiconductor layer 113 of the working electrode 210 increases or decreases only in the connection region installed portion, voltage concentrates between the connection region installed portion and the porous oxide semiconductor layer 113 of the working electrode 210, resulting in increased susceptibility to the application of negative voltage. With respect to this point, in the present embodiment, the connection region 160 of the bypass diode 70 is provided at a location that does not overlap with the porous oxide semiconductor layer 113 in the case of viewing the connection region 160 and the porous oxide semiconductor layer 113 from the direction A perpendicular to the surface 214a of the electrically conductive substrate 214. Consequently, it becomes increasingly difficult to form a portion where inter-electrode distance between the counter electrode 220 and the porous oxide semiconductor layer 113 of the working electrode 210 differs, and it becomes increasingly difficult for voltage to concentrate between the counter electrode 220 and the porous oxide semiconductor layer 113 of the working electrode 210, thereby resulting in less susceptibility to the application of negative voltage. Consequently, the occurrence of a malfunction in the dye-sensitized solar cells 60 can be adequately prevented, and the durability of the dye-sensitized solar cell module 200 can be further improved.

Fourthly, the dye-sensitized solar cell module 200 of the present embodiment also differs from the dye-sensitized solar cell module 100 of the first embodiment in that a transparent substrate 211 contained in the working electrode 210 of each dye-sensitized solar cell 60 is used as a common transparent substrate with the working electrode 210 of a plurality of the dye-sensitized solar cells 60.

The material that composes the transparent substrate 211 is the same as that of the transparent substrate 111.

The metal material that composes the counter electrode substrate 221 is a corrosion-resistant metal material such as titanium, nickel, platinum, molybdenum or tungsten.

The back sheet 150 is obtained by sequentially laminating, for example, a first thermoplastic resin layer, a metal layer, a second thermoplastic resin layer and a weatherproof layer.

The first thermoplastic resin layer and the second thermoplastic resin layer are for adhering the metal layer and back side of the dye-sensitized solar cells 60 and the metal layer and the weatherproof layer, respectively, and the metal layer is for blocking water vapor that enters the dye-sensitized solar cells 60. The weatherproof layer is a layer provided on the outermost side with respect to the dye-sensitized solar cells 60, and is for inhibiting deterioration of the resin layer and thermoplastic resin layers caused by repeated irradiation by sunlight. The weatherproof layer is directed to the opposite side from the dye-sensitized solar cells 60.

The metal layer may be composed of a metal material that contains aluminum. Although the metal material is normally composed of aluminum alone, it may also be an alloy of aluminum and other metals. Examples of other metals include copper, manganese, zinc, magnesium, lead and bismuth.

The thickness of the metal layer is preferably 1 µm to 50 µm and more preferably 6 µm to 25 µm. If the thickness of the metal layer is within the above-mentioned ranges, there is less susceptibility to the formation of pinholes and water vapor can be more effectively blocked as compared with the case of a thickness of less than 1 μm. In addition, if the thickness of the metal layer is within the above-mentioned ranges, in addition to easily following the shape of the back side of the dye-sensitized solar cells 60, the amount of material used can be reduced, thereby making it possible to lower costs as compared with the thickness exceeding 50 μm.

The first and second thermoplastic resin layers may contain a thermoplastic resin, and examples of such thermoplastic resins include acid-modified polyolefin-based thermoplastic resins such as ionomers, ethylene-methacrylic acid copolymers, maleic anhydride-modified polyethylene or ethylene-acrylic acid copolymers.

The thickness of the first and second thermoplastic resin layers is 20 μm to 100 μm and more preferably 30 μm to 80 μm. If the thickness of the first and second thermoplastic resin layers is within the above-mentioned ranges, stronger adhesion can be maintained between the metal layer and the dye-sensitized solar cells 60 or the weatherproof layer as compared with the case of the thickness being less than 20 μm. In addition, if the thickness of the first and second thermoplastic resin layers is within the above-mentioned ranges, the first and second thermoplastic resin layers have better thermal stability, and deformation of the entire structure due to deformation of thermoplastic resin is more adequately inhibited as compared with the case of the thickness exceeding 100 μm.

The weatherproof layer is composed of a weatherproof material. The weatherproof material preferably contains a thermoplastic resin. In this case, adhesion with the second thermoplastic resin layer can be further improved as compared with the case of the weatherproof layer not containing a thermoplastic resin. Examples of thermoplastic resins include polyesters such as polyethylene terephthalate (PET), polybutylene terephthalate (PBT) or polyethylene naphthalate (PEN), and polyolefins such as polyethylene or polypropylene.

The present invention is not limited to the above-mentioned embodiments. For example, although a single bypass diode 70 is connected in parallel to three dye-sensitized solar cells 60 connected in series in the power generation unit 50 in the above-mentioned first embodiment, a single bypass diode 70 may be connected in parallel to four dye-sensitized solar cells 60 connected in series, a single bypass diode 70 may be connected in parallel to two dye-sensitized solar cells 60 connected in series, or as in the second embodiment, a single bypass diode 70 may be connected in parallel to a single dye-sensitized solar cell 60. Furthermore, even in the case of a single bypass diode 70 being connected in parallel to four dye-sensitized solar cells 60, the maximum voltage applied to an abnormal cell becomes +0.7 [V]−0.7×(4−1) [V]=1.4 [V], and reverse voltage of −2.0 V, at which the dye-sensitized solar cells 60 degrade, is not applied to the abnormal cell.

In particular, an aspect in which a single bypass diode 70 is connected in parallel to two dye-sensitized solar cells 60 connected in series or an aspect in which a single bypass diode 70 is connected in parallel to a single dye-sensitized solar cell 60 is preferable. In the case in which a single bypass diode 70 is connected in parallel to two dye-sensitized solar cells 60 connected in series, the maximum voltage applied to an abnormal cell among the two dye-sensitized solar cells 60 connected in parallel to the bypass diode 70 becomes 0.7 [V], while in the case of a single bypass diode 70 being connected in parallel to a single dye-sensitized solar cell 60, the maximum voltage applied to the abnormal cell becomes 0 [V]. Namely, there is no longer concern over reverse voltage being applied to the abnormal cell. Accordingly, there is no longer concern over cell degradation caused by reverse voltage in the dye-sensitized solar cell 60.

In addition, although all of the power generation units 50 in the above-mentioned first embodiment have three dye-sensitized solar cells 6, a portion of the power generation units 50 may have three dye-sensitized solar cells 60 while the remainder have two dye-sensitized solar cells 60, or a portion of the power generation units 50 may have one dye-sensitized solar cell 60 while the remainder have four dye-sensitized solar cells 60. Moreover, the number of dye-sensitized solar cells 60 may also differ for each power generation unit 50.

Moreover, the dye-sensitized solar cell module of the present invention may or may not have dye-sensitized solar cells to which bypass diodes are not connected in parallel. Namely, in the dye-sensitized solar cell module of the present invention, in the case in which:

the total number of dye-sensitized solar cells 60 connected in series is represented by m (where m represents an integer of 2 or more), the number of power generation units 50 in which n is 1 is represented by p1 (where p1 represents an integer of 0 or more), the number of power generation units 50 in which n is 2 is represented by p2 (where p2 represents an integer of 0 or more), the number of power generation units 50 in which n is 3 is represented by p3 (where p3 represents an integer of 0 or more), the number of power generation units 50 in which n is 4 is represented by p4 (where p4 represents an integer of 0 or more), and the number of dye-sensitized solar cells 60 to which the bypass diodes 70 are not connected in parallel is represented by k, although k is represented by the following formula:

$$k=m-(1\times p1+2\times p2+3\times p3+4\times p4)$$

(wherein, the total of p1 to p4 is 1 or more), k may be 0 or an integer of 1 or more.

However, k is preferably 0. In this case, there are no longer any dye-sensitized solar cells in the dye-sensitized solar cell module to which bypass diodes are not connected in parallel. Thus, in a dye-sensitized solar cell module in which k is 0, current is bypassed to a bypass diode no matter which dye-sensitized solar cell becomes an abnormal cell. Consequently, a dye-sensitized solar cell module in which k is 0 is able to function better in terms of the overall dye-sensitized solar cell module in comparison with the case in which dye-sensitized solar cells to which bypass diodes are not connected in parallel are present.

In addition, although the back sheet 150 is used in the above-mentioned second embodiment, the back sheet 150 may also be omitted.

Moreover, although the connection region 160 for the bypass diode 70 for connection to the counter electrode 220 is provided at a location that does not overlap with the porous oxide semiconductor layer 113 in the case of viewing the connection region 160 and the porous oxide semiconductor layer 113 from the direction A perpendicular to the surface 214a of the electrically conductive substrate 214 in the above-mentioned second embodiment, the connection region 160 may also be provided at a location that overlaps with the porous oxide semiconductor layer 113.

In addition, although each bypass diode 70 is connected to the back sides 221*a* of the counter electrode substrates 221 contained in the counter electrodes 220 of two dye-sensitized solar cells 60 in the above-mentioned second embodiment, each bypass diode 70 may also connect the transparent electrically conductive films 112 contained in the working electrodes 210 of two dye-sensitized solar cells 60, or the bypass diode 70 may connect the back side 221*a* of the counter electrode substrate 221 contained in the counter electrode 220 with the transparent electrically conductive film 112 contained in the working electrode 210 of an adjacent dye-sensitized solar cell 60.

EXAMPLES

Although the following provides a more specific explanation of the contents of the present invention by listing examples and comparative examples, the present invention is not limited to the following examples.

Example 1

48 square dye-sensitized solar cells measuring 20 cm on a side were prepared. Here, the dye-sensitized solar cells were composed of a counter electrode, a working electrode, a seal portion and an electrolyte surrounded thereby. A counter electrode obtained by coating Pt on Ti foil was used for the counter electrode, while a working electrode obtained by forming a porous oxide semiconductor layer composed of $TiO_2$ on FTO glass was used for the working electrode. In addition, Himilan manufactured by DU PONT-MITSUI POLYCHEMICALS CO., LTD. was used for the seal portion, and an electrolyte obtained by adding LiI, $I_2$ and 4-t-butylpyridine to a solvent composed of 1-hexyl-3-methylimidazolium iodide was used for the electrolyte. The 48 dye-sensitized solar cells were connected in series, and a single bypass diode (Schottky Diode, 1N5822 manufactured by On Semiconductor Corporation) was connected in parallel for every three dye-sensitized solar cells. At this time, the bypass diode was connected in parallel to three dye-sensitized solar cells in the manner described below. Namely, one connection terminal of a bypass diode having two connection terminals was connected to the back side of the Ti foil composing the counter electrode substrate of a certain dye-sensitized solar cell, while the other connection terminal was connected from the dye-sensitized solar cell to which the one connection terminal of the bypass diode was connected to the back side of the Ti foil of the third dye-sensitized solar cell. 16 power generation units were fabricated in this manner.

Next, a resistor was connected in parallel to the 16 power generation units obtained in the manner described above. Here, diodes were connected in series to the resistor. A dye-sensitized solar panel was obtained in this manner. Four dye-sensitized solar panels obtained in this manner were fabricated, and these were connected in series with a blocking diode. The terminal on the side of the blocking diode was then connected to a power generation system power collection line, and the terminal on the side of the dye-sensitized solar panels was connected to a ground line. A dye-sensitized solar cell module was obtained in this manner.

Example 2

A dye-sensitized solar cell module was fabricated in the same manner as Example 1 with the exception of fabricating 48 power generation units obtained by connecting bypass diodes in parallel at the rate of one bypass diode to one dye-sensitized solar cell, and obtaining dye-sensitized solar panels by connecting a resistor in parallel to the 48 power generation units. Furthermore, in the present example, each bypass diode was specifically connected in parallel to a single dye-sensitized solar cell in the manner described below. Namely, one connection terminal of a bypass diode having two connection terminals was connected to the back side of the Ti foil composing the counter electrode substrate of a certain dye-sensitized solar cell, while the other connection terminal was connected from the dye-sensitized solar cell to which the one connection terminal of the bypass diode was connected to the back side of the Ti foil of the first dye-sensitized solar cell.

Example 3

A dye-sensitized solar cell module was fabricated in the same manner as Example 1 with the exception of fabricating 24 power generation units obtained by connecting bypass diodes in parallel at the rate of one bypass diode to two dye-sensitized solar cells, and obtaining dye-sensitized solar panels by connecting a resistor in parallel to the 24 power generation units. Furthermore, in the present example, each bypass diode was specifically connected in parallel to two dye-sensitized solar cells in the manner described below. Namely, one connection terminal of a bypass diode having two connection terminals was connected to the back side of the Ti foil composing the counter electrode substrate of a certain dye-sensitized solar cell, while the other connection terminal was connected from the dye-sensitized solar cell to which the one connection terminal of the bypass diode was connected to the back side of the Ti foil of the second dye-sensitized solar cell.

Example 4

A dye-sensitized solar cell module was fabricated in the same manner as Example 1 with the exception of fabricating 12 power generation units obtained by connecting bypass diodes in parallel at the rate of one bypass diode to four dye-sensitized solar cells, and obtaining dye-sensitized solar panels by connecting a resistor in parallel to the 12 power generation units. Furthermore, in the present example, each bypass diode was specifically connected in parallel to four dye-sensitized solar cells in the manner described below. Namely, one connection terminal of a bypass diode having two connection terminals was connected to the back side of the Ti foil composing the counter electrode substrate of a certain dye-sensitized solar cell, while the other connection terminal was connected from the dye-sensitized solar cell to which the one connection terminal of the bypass diode was connected to the back side of the Ti foil of the fourth dye-sensitized solar cell.

Comparative Example 1

A dye-sensitized solar cell module was fabricated in the same manner as Example 1 with the exception of fabricating one power generation unit obtained by connecting bypass diodes in parallel at the rate of one bypass diode to 48 dye-sensitized solar cells, and obtaining dye-sensitized solar panels by connecting a resistor in parallel to the single power generation unit. Furthermore, in the present example, each bypass diode was specifically connected in parallel to the 48 dye-sensitized solar cells in the manner described below. Namely, one connection terminal of a bypass diode having two connection terminals was connected to the back side of the Ti foil composing the counter electrode substrate of a certain dye-sensitized solar cell, while the other connection terminal was connected from the dye-sensitized solar cell to which the one connection terminal of the bypass diode was connected to the back side of the Ti foil of the 48th dye-sensitized solar cell.

Comparative Example 2

A dye-sensitized solar cell module was fabricated in the same manner as Example 1 with the exception of fabricating 8 power generation units obtained by connecting bypass diodes in parallel at the rate of one bypass diode to 6 dye-sensitized solar cells, and obtaining dye-sensitized solar panels by connecting a resistor in parallel to the 8 power generation units. Furthermore, in the present example, each bypass diode was specifically connected in parallel to 6 dye-sensitized solar cells in the manner described below. Namely, one connection terminal of a bypass diode having two connection terminals was connected to the back side of the Ti foil composing the counter electrode substrate of a certain dye-sensitized solar cell, while the other connection terminal was connected from the dye-sensitized solar cell to which the one connection terminal of the bypass diode was connected to the back side of the Ti foil of the 6th dye-sensitized solar cell.

(Evaluation of Durability)

An outdoor exposure test was carried out on the dye-sensitized solar cell modules of Examples 1 to 4 and Comparative Examples 1 and 2, changes over time in energy conversion efficiency η (%), which indicates overall efficiency of dye-sensitized solar cell modules, were measured, and durability of the dye-sensitized solar cell modules was evaluated by measuring the number of days until the energy conversion efficiency η reached 50% or less of the initial value thereof. The results are shown in Table 1.

TABLE 1

|  | No. of cells in power generation units (n) | No. of days until η reached 50% or less of initial value (days) |
|---|---|---|
| Example 1 | 3 | 234 |
| Example 2 | 1 | 300 or more |
| Example 3 | 2 | 300 or more |
| Example 4 | 4 | 228 |
| Comparative Example 1 | 48 | 14 |
| Comparative Example 2 | 6 | 67 |

According to the results shown in Table 1, the dye-sensitized solar cell modules of Examples 1 to 4 demonstrated an extremely large number of days until η reached 50% or less of the initial value thereof in comparison with the dye-sensitized solar cell modules of Comparative Examples 1 and 2.

Thus, the dye-sensitized solar cell module of the present invention was confirmed to have superior durability.

EXPLANATION OF REFERENCE NUMERALS

50 Power generation unit
60 Dye-sensitized solar cell
70 Bypass diode
100, 200 Dye-sensitized solar cell module
110 Working electrode
113 Porous oxide semiconductor layer
114, 214 Electrically conductive substrate
120 Counter electrode
122 Counter electrode substrate
150 Back sheet
160 Connection region
214a Surface of electrically conductive substrate
221a Back side
A Direction perpendicular to surface of electrically conductive substrate

The invention claimed is:

1. A dye-sensitized solar cell module having a plurality of dye-sensitized solar cells connected in series,
the dye-sensitized solar cell module having at least one power generation unit in which at least one bypass diode is connected in parallel to n number (where n represents an integer of 1 to 4) of dye-sensitized solar cells among the plurality of the dye-sensitized solar cells;
wherein each of the dye-sensitized solar cells contains:
a working electrode having an electrically conductive substrate and only one porous oxide semiconductor layer provided on the electrically conductive substrate,
a counter electrode, which has a metal substrate, opposite the working electrode, and
a sealing portion, the sealing portion being sandwiched by the electrically conductive substrate and the counter electrode,
wherein the at least one bypass diode is provided to overlap with the sealing portion when the at least one bypass diode and the sealing portion are viewed from a direction perpendicular to the interface between the electrically conductive substrate and the porous oxide semiconductor layer,
wherein each of the at least one bypass diode directly connects the back sides of the metal substrates of two of the dye-sensitized solar cells, the metal substrates forming a gap therebetween, the back sides of the metal substrates being on a side that faces in the opposite direction from the working electrode;
wherein each of the at least one bypass diode has a body portion which overlaps with the gap when the at least one bypass diode and the gap are viewed from a direction perpendicular to the interface between the electrically conductive substrate and the porous oxide semiconductor layer: and
wherein the electrically conductive substrate, the sealing portion, the counter electrode, and the at least one bypass diode are arranged in this sequence in the direction perpendicular to interface between the electrically conductive substrate and the porous oxide semiconductor layer.

2. The dye-sensitized solar cell module according to claim 1, wherein n is 2.

3. The dye-sensitized solar cell module according to claim 1, wherein
one of the working electrode and the counter electrode in at least one of the dye-sensitized solar cells among the n number of dye-sensitized solar cells contained in the power generation unit has a flexible substrate.

4. The dyes-sensitized solar cell module according to claim 1, wherein
the working electrode further has a photosensitizing dye deposited onto the oxide porous semiconductor layer, and a connection region for the at least one bypass diodes to the working electrode or the counter electrode is provided at a location where the region does not overlap with the porous oxide semiconductor layer in cases where the connection region and the porous oxide semiconductor layer are viewed from a direction perpendicular to the interface between electrically conductive substrate and the porous oxide semiconductor layer.

5. The dye-sensitized solar cell module according to claim 1, further comprising a back sheet that covers the plurality of the dye-sensitized solar cells, wherein
the at least one of the bypass diodes is provided between the back sheet and the plurality of the dye-sensitized solar cells.

6. The dye-sensitized solar cell module according to claim 1, wherein in each of the dye-sensitized solar cells, a reverse voltage of −2.0 V or less can be applied.

* * * * *